J. F. O'CONNOR.
DRAFT RIGGING FOR RAILWAY CARS.
APPLICATION FILED MAR. 29, 1907.

1,008,670.

Patented Nov. 14, 1911.

2 SHEETS—SHEET 1.

Witnesses:
Wm. Geiger
H. W. Munday.

Inventor
John F. O'Connor
By Munday, Evarts, Adcock & Clarke.
Attorneys

J. F. O'CONNOR.
DRAFT RIGGING FOR RAILWAY CARS.
APPLICATION FILED MAR. 29, 1907.
1,008,670.   Patented Nov. 14, 1911.
2 SHEETS—SHEET 2.
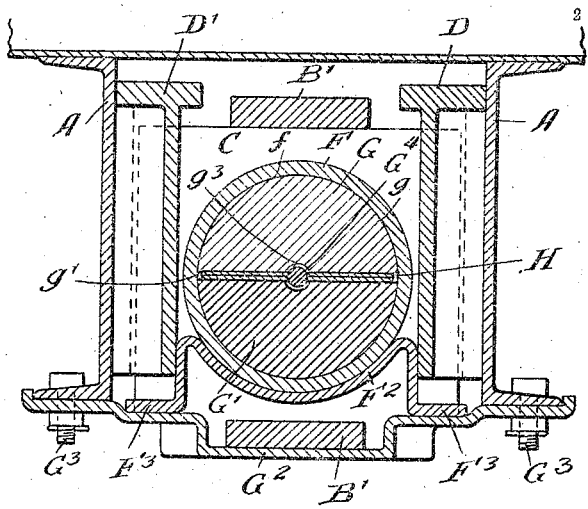
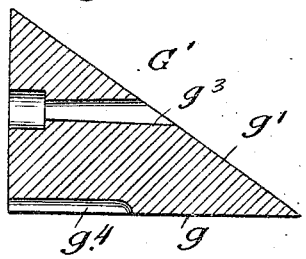
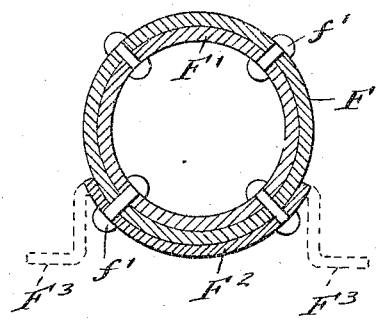
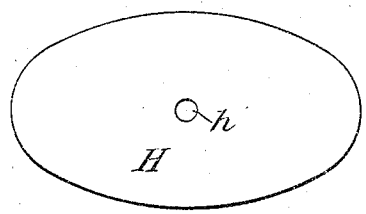
Witnesses:
Wm. Geiger
H. M. Munday
Inventor:
John F. O'Connor
By Munday, Evarts, Adcock & Clarke
Attorneys

UNITED STATES PATENT OFFICE.

JOHN F. O'CONNOR, OF CHICAGO, ILLINOIS, ASSIGNOR, BY MESNE ASSIGNMENTS WILLIAM H. MINER, OF CHICAGO, ILLINOIS.

DRAFT-RIGGING FOR RAILWAY-CARS.

1,008,670.     Specification of Letters Patent.     Patented Nov. 14, 1911.

Application filed March 29, 1907. Serial No. 365,231.

*To all whom it may concern:*

Be it known that I, JOHN F. O'CONNOR, a citizen of the United States, residing in Chicago, in the county of Cook and State of Illinois, have invented a new and useful Improvement in Draft-Rigging for Railway-Cars, of which the following is a specification.

My invention relates to friction draft rigging for railway cars. Its object is to provide a friction draft rigging of a strong, simple, efficient, safe, reliable and durable construction, having a direct acting spring in tandem with the friction devices and coöperating therewith, and in which the wedging faces of the friction blocks or devices will not stick or cause the friction devices to act irregularly and uncertainly.

My invention consists, in connection with the draw bar, draw-bar strap or yoke, followers, stops for the followers, direct acting spring in line with the draw bar, a longitudinally movable friction shell having an internal friction face parallel to the draw bar, and a plurality of sliding friction blocks having external friction faces parallel to the internal friction face of said shell and in sliding frictional engagement therewith, and provided with inclined or wedging meeting faces, and a yielding flat sheet or plate member, preferably of leather, rubber, fibrous fabric, or other like slightly yielding material, interposed between the meeting inclined or wedging faces of the friction blocks or devices to prevent the same from sticking, and thus to cause the friction devices to act with certainty, regularity and reliability.

It also consists in the novel construction of parts and devices and in the novel combination of parts and devices herein shown and described.

Figure 1:
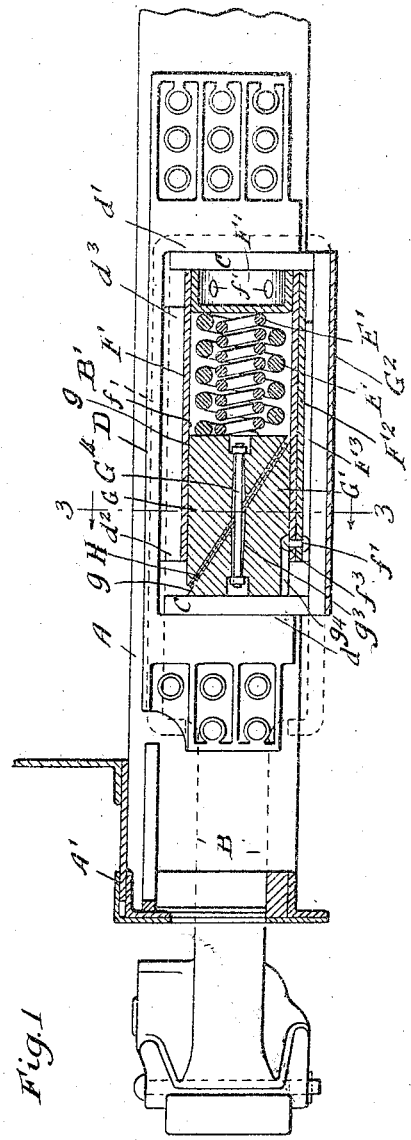
Figure 2:
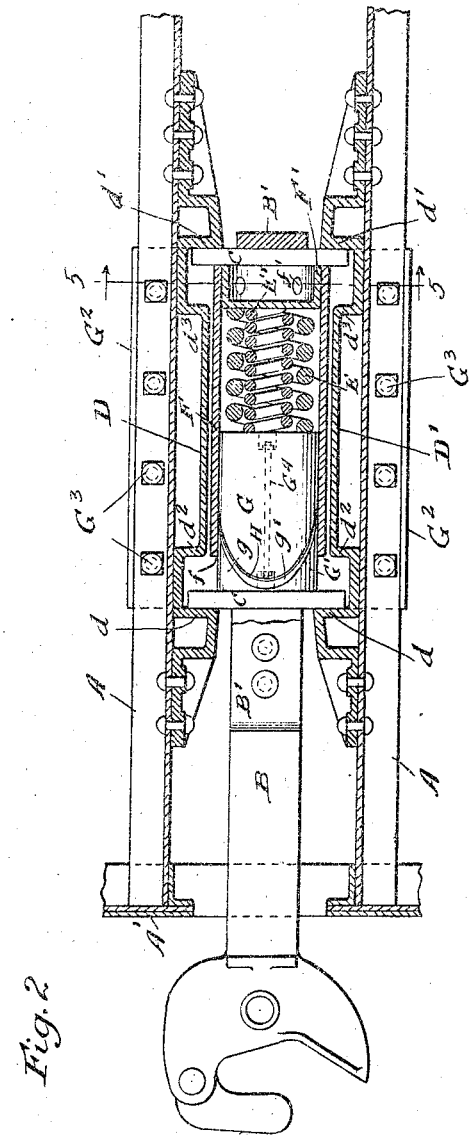

In the accompanying drawing, forming a part of this specification, Figure 1 is a side elevation, partly in central vertical section, of a friction draft rigging embodying my invention; Fig. 2 is a plan view, partly in central horizontal section; Fig. 3 is a cross section on line 3—3 of Fig. 1; Fig. 4 is a detail vertical longitudinal section of one of the friction blocks; Fig. 5 is a detail cross section on line 5—5 of Fig. 2, and Fig. 6 is a detail face or plan view of the yielding member, sheet or plate, which is interposed between the inclined or wedging faces of the friction blocks.

In the drawing A represents the center sills or frame members of the car to which the draft rigging is applied or secured, and $A^1$ the front or end sill.

B is the draw bar and $B^1$ the draw bar strap or yoke, C C the followers, D $D^1$ the side plates or stop castings having front and rear stops or shoulders $d$ $d^1$ for the followers to abut against, and also preferably intermediate stops $d^2$ $d^3$ to limit the longitudinal movement of the followers.

E is the direct acting spring of the draft rigging in line with the draw bar, the same having preferably a smaller spring $E^1$ inside it.

F is a longitudinally movable friction shell having a longitudinally extending internal friction face $f$ parallel with the draw bar, and G $G^1$ are sliding or longitudinally movable friction blocks or devices fitting inside the friction shell F, and having external friction faces $g$ parallel to and in sliding frictional engagement with the internal friction face $f$ of the friction shell F. The friction blocks or devices G $G^1$ have inclined or wedging meeting faces $g^1$ to force the friction blocks into close frictional engagement with the friction shell under action of the draw bar and the direct acting draft rigging spring E in respect to which the friction blocks are arranged in tandem.

H is the yielding sheet or plate member interposed between the meeting inclined or wedging faces of the friction blocks or devices G $G^1$, the same being preferably of leather, rubber, fiber, fabric, or other slightly yielding material which will operate to prevent the inclined or wedging faces of the friction blocks from sticking and thus causing the friction blocks and friction shell, or other equivalent friction devices employed, to act irregularly and uncertainly.

The longitudinally movable friction shell F is closed at one end, preferably at the rear end, by a flanged head or thimble $F^1$, preferably secured to the shell by rivets $f^1$. And this shell F is firmly supported and guided, and prevented from turning by a saddle $F^2$ having lateral guide flanges $F^3$, which fit and rest upon the lower removable guide or bottom plate $G^2$, which is preferably secured to the stationary frame work of the car by bolts G³. The saddle F² is secured to the friction shell F by rivets f¹ some of which preferably extend through the head or thimble F¹.

The friction blocks G G¹ are preferably movably connected together or held in their assembled position by a rod G⁴ which extends through tapering holes g³ extending longitudinally through the friction blocks G G¹. The interposed yielding sheet plate or member H is furnished with a central hole h through which the connecting bolt G² extends. To prevent the friction blocks or devices G G¹ from turning in the friction shell, the lower friction block G is furnished with a longitudinal groove g⁴ in which fits the head f³ of one of the rivets f¹ by which the friction shell F is connected to its saddle F². This guide groove and rivet thus constitute simply guide devices to permit the friction shell and block to slide or reciprocate in respect to each other while preventing them from turning.

The plate H of leather, rubber, fiber, or other yielding or resilient material should preferably be from one-fourth to one-half inch in thickness, depending upon its density and solidity or compressibility. And it operates to permit a slight limited movement of the friction blocks G and G¹ in respect to each other without necessitating any sliding movement of their inclined faces on or against the contacting faces of the plate H, as the yielding material of the plate will itself initially give sufficiently in the direction of the plane of the plate to partially accommodate the required spreading or separating movement of the blocks G and G¹ and to transmit or transfer the longitudinal thrust of the draw-bar against the friction blocks G and G¹ into a transverse pressure between the external friction faces of the blocks G G¹ and internal friction face of the friction shell F. And as the plate H is of yielding material and separates the inclined or wedging faces of the friction blocks, it effectually prevents the sticking of said faces together as well as from their sticking or being held immovable in respect to the interposed plate H itself, the yielding of the material of the plate H itself permitting an initial movement. I thus effectively overcome or avoid all tendency of the wedging faces of the friction blocks or devices to stick. And by reason of the resiliency of the leather or rubber material of the plate H, when the load is released, it tends to restore itself to its original volume or normal position and thus initially release the friction blocks G G¹ from any sticking contact with the friction shell F, and this without the necessity of the wedging faces of the friction blocks G G¹ having any initial sliding movement on the contacting faces of the interposed plate H.

I claim:

1. In a friction draft rigging, the combination with a draw bar, draw bar yoke, front and rear followers, a direct acting spring in line with the draw bar, and stops for the followers, of a longitudinally movable friction shell having an internal friction face, a plurality of coöperating sliding friction blocks having external friction faces parallel to and in sliding frictional engagement with the internal face of said shell, said friction blocks having wedging faces, a plate of yielding material interposed between the inclined or wedging faces of said friction blocks to prevent the same from sticking in respect to each other and acting irregularly and uncertainly and a connecting bolt extending through the friction blocks and said interposed plate of yielding material, substantially as specified.

2. In a friction draft rigging, the combination with the draw-bar and spring, of a friction shell, friction blocks within the shell having wedging faces, of a plate of leather interposed between the wedging faces of the friction blocks and extending at an angle to the draw-bar and the axis of the friction shell, said interposed leather plate coacting with said friction blocks to prevent their sticking in respect to each other, substantially as specified.

3. In a friction draft rigging, the combination with a longitudinally movable friction shell, sliding friction blocks within the shell having wedging faces, and a resilient plate interposed between the wedging faces of the friction blocks and extending at an angle to the draw-bar, and the axis of the friction shell to prevent said faces from sticking in respect to each other, substantially as specified.

JOHN F. O'CONNOR.

Witnesses:
EDMUND ADCOCK,
H. M. MUNDAY.